United States Patent
Niebling et al.

(10) Patent No.: US 7,837,392 B2
(45) Date of Patent: Nov. 23, 2010

(54) WHEEL BEARING ARRANGEMENT HAVING SPUR TOOTHING

(75) Inventors: Peter Niebling, Bad Kissingen (DE); Ernst Masur, Grettstadt (DE); Roland Langer, Schwanfeld (DE)

(73) Assignee: Schaeffler KG, Herzogenaurach (DE)

(*) Notice: Subject to any disclaimer, the term of this patent is extended or adjusted under 35 U.S.C. 154(b) by 390 days.

(21) Appl. No.: 11/997,577

(22) PCT Filed: Aug. 2, 2006

(86) PCT No.: PCT/DE2006/001343
§ 371 (c)(1), (2), (4) Date: Feb. 1, 2008

(87) PCT Pub. No.: WO2007/014553
PCT Pub. Date: Feb. 8, 2007

(65) Prior Publication Data
US 2008/0240635 A1   Oct. 2, 2008

(30) Foreign Application Priority Data
Aug. 4, 2005  (DE) ................ 10 2005 036 659

(51) Int. Cl.
*F16C 19/08* (2006.01)
(52) U.S. Cl. .................................. 384/544
(58) Field of Classification Search ........ 384/544, 384/589, 510, 516, 450; 464/178, 906; 301/105.1
See application file for complete search history.

(56) References Cited

U.S. PATENT DOCUMENTS

| 4,352,528 A | * | 10/1982 | Guimbretiere | 384/512 |
| 4,460,058 A | * | 7/1984 | Welschof et al. | 464/906 |
| 4,493,388 A | * | 1/1985 | Welschof et al. | 384/544 |
| 4,893,960 A | * | 1/1990 | Beier et al. | 403/24 |
| 5,607,241 A | * | 3/1997 | Fukumura | 384/537 |
| 5,806,936 A | * | 9/1998 | Guimbretiere | 301/105.1 |
| 6,022,275 A | * | 2/2000 | Bertetti | 464/178 |

FOREIGN PATENT DOCUMENTS

| DE | 31 16 720 XA | 10/1982 |
| DE | 197 07 766 A | 8/1997 |

* cited by examiner

*Primary Examiner*—Thomas R Hannon
(74) *Attorney, Agent, or Firm*—Lucas & Mercanti, LLP

(57) ABSTRACT

A wheel bearing arrangement which has at least two rows of rolling bodies for mounting a wheel hub which can be driven with the wheel bearing arrangement by a drive element. The wheel hub is connected to the drive element, and the wheel hub and the drive element engage positively into one another via a pair of mutually corresponding spur toothings. In the wheel bearing arrangement, a value of greater than three is obtained for a ratio of the diameter of a toothing reference circle of the spur toothing in the wheel bearing arrangement to the rolling body row spacing of the at least two rows of rolling bodies.

7 Claims, 1 Drawing Sheet

WHEEL BEARING ARRANGEMENT HAVING SPUR TOOTHING

FIELD OF THE INVENTION

The invention relates to a wheel bearing arrangement having at least two rows of rolling bodies for mounting a wheel hub which can be driven with the wheel bearing arrangement by a drive element, the wheel hub being connected to the drive element, and the wheel hub and the drive element engaging in a form-fitting manner into one another by means of a pair of mutually corresponding spur toothing systems.

BACKGROUND OF THE INVENTION

A wheel bearing arrangement of this type having spur toothing and a function of the spur toothing are described in detail in DE 31 16 720 C1. The spur toothing can be introduced into the wheel hub, for example, by manufacturing without the removal of material, as is known, furthermore, from DE 31 16 720 C1.

The connection between the wheel hub and the drive element by means of the spur toothing saves installation space and permits the transmission of relatively high moments which, however, are subject to limits on account of the dimensions of wheel bearing arrangements.

Moreover, the known wheel bearing arrangements or units have a relatively high weight and a relatively low bearing stiffness.

Here, the bearing stiffness is the resistance which the (wheel bearing) unit applies against elastic deflections which are caused by loadings. The bearing stiffness results in a tilting stiffness which results from the ratio of moments from loadings to the tilting angle in the wheel bearing, for example in Nm/°. This is smaller the more the wheel bearing tilts in the case of loadings, that is to say the greater the tilting angle is under the same loading.

The loadings are those loadings which substantially act on a vehicle wheel and the associated wheel suspension system in the operating state of the vehicle. The lower the bearing stiffness the more the loadings bring about tilting of the wheel system which has a disadvantageous effect on the driving behavior of the vehicle, in particular when driving around bends, and has a disadvantageous effect on the wear of the brake and the function of the brake.

SUMMARY OF THE INVENTION

It is therefore the object of the invention to provide a rigid wheel bearing arrangement for transmitting high moments.

This object is achieved by the wheel bearing arrangement having the features in accordance with the independent claim.

The wheel bearing arrangement according to the invention has at least two rows of rolling bodies for mounting a wheel hub which can be driven with the wheel bearing arrangement by a drive element. The wheel hub is connected to the drive element; the wheel hub and the drive element engage in a form-fitting manner into one another by means of a pair of mutually corresponding spur toothing systems.

In the wheel bearing arrangement according to the invention, at least on one spur toothing system (10) of the pairing, in particular the spur toothing system on the wheel bearing arrangement side, a ratio of the diameter (VTK) of a toothing reference circle of the spur toothing system which is, in particular, on the wheel bearing arrangement side to the rolling body row spacing (RA) of the at least two rows of rolling bodies is realized to be greater than three, that is to say $$(VTK/RA) > 3.$$

Here, the rolling body row spacing (RA) of the at least two rows of rolling bodies is to be understood as the axial spacing (RA) which is oriented in the same direction as the rotational axis of the wheel bearing arrangement between the centers of the rolling bodies of the at least two rows of rolling bodies.

The toothing reference circle (VTK) is a difference from the radial external diameter (VDA) of the toothing system of the spur toothing system which is on the wheel bearing arrangement side and from a tooth width (ZB) of those teeth of the toothing system of the spur toothing system which is on the wheel bearing arrangement side which are formed furthest to the radial outside, that is to say:

$$VTK = VDA - ZB.$$

The external diameter (VDA) is an imaginary circle, which makes contact with the teeth of the toothing system radially on the outside of the tooth root, about the rotational axis of the wheel bearing arrangement or, in other words, the external diameter (VDA) of the toothing system is the diameter of an imaginary circle, by which the teeth which lie the furthest to the radial outside are reached around radially to the outside.

The teeth which are spaced apart from one another on the circumferential side extend from the circle with the tooth width (ZB) radially to the rotational axis or else to the inside in a mariner which is oriented obliquely with respect to said rotational axis.

Accordingly, the application of the invention can also be used for toothing systems which have teeth of different tooth width ZB or which are provided with teeth which have the same tooth width ZB and are offset radially with respect to one another.

The tooth width ZB describes the spacing at the level of the tooth root between the radially outer bounding face and the radially inner bounding face of the respective tooth. The tooth root is described by the boundary/contour line, at which the tooth protrudes from or merges into the material of the component, on which the toothing system is formed.

This boundary therefore extends in the tooth gaps of circumferentially adjacent teeth between the radially lowest points of the gaps and from the gap radially on the outside and radially on the inside of the tooth to the next tooth gap. The tooth number Z is the overall number of teeth of the toothing system which are adjacent to one another circumferentially, as a rule with the same pitch.

In each case preferred, advantageous and non-trivial developments of the inventive subject matter according to the independent claim are to be gathered from the dependent claims.

In developing embodiments, the invention as a rule relates to wheel bearing arrangements, in which the wheel hub and the drive element can be connected to one another and can be released from one another again.

In this "classic" case, the two components engage in a form-fitting manner into one another without play via the spur toothing systems and are clamped axially against one another by way of a central screw.

It is also conceivable that the form-fitting connection is secured in a material-to-material manner by means of the spur toothing systems or in a nonreleasable manner in another way. Here, the connection at the toothing systems is as a rule of self-locking design.

Furthermore, in developing embodiments, the invention relates, as a rule, to wheel bearing arrangements having at least one outer part, having at least one or a plurality of inner parts and having the at least two rows of rolling bodies which are arranged between the outer part on one side and the at least one or plurality of inner parts on the other side.

As a rule, in each case at least one inner raceway is formed on the outer part and in each case at least one outer raceway is formed on the one inner part or on the plurality of inner parts for the rolling bodies of at least one rolling body row.

The wheel hub is fixedly at least coupled in terms of rotation to the at least one outer raceway, that is to say, for example, either the wheel hub is the inner part itself and then has at least the at least one outer raceway, or at least one inner ring is seated as inner part on the wheel hub.

In developing embodiments, the invention also relates as a rule to wheel bearing arrangements having an inner ring which is seated on the wheel hub and having a corresponding inner ring seat diameter for one of the rolling body rows, the inner ring being at least held axially on the wheel hub by means of a collar which is formed radially to the outside from a hollow section of the wheel hub.

In one preferred development, a ratio of the diameter (VTK) of the toothing reference circle of the spur toothing system which is on the wheel bearing arrangement side to the diameter of the rolling bodies (DW) of one of the at least two rows of rolling bodies is realized to be greater than four, that is to say $(VTK/DW)>4$, Here, the diameter of the rolling bodies (DW) of that one of the at least two rows of rolling bodies can preferably be used, which rolling body row lies axially closest to the spur toothing system on the wheel bearing arrangement side. The diameter of the rolling bodies (DW) of that one of the at least two rows of rolling bodies having the smallest loadbearing rolling bodies of the wheel bearing unit can also be used.

Furthermore, there can preferably be provision for the ratio of the inner ring seat diameter (DIR) to the bearing cross section (QL) to be realized to be greater than 2.2, that is to say $(DIR/QL)>2.2$.

The bearing cross section (QL) is described by the radial spacing between the inner ring seat diameter (DIR), that is to say the bearing hole, by way of the inner diameter DL (free internal diameter of the inner part), and is defined by the diameter (DA) of the outer part (bearing external diameter) or, in the case of an outer part which is not rotationally symmetrical, by the smallest radial spacing DA of two points $P_1$ and $P_2$ of the outer contour of the outer part which lie opposite one another on the rotational axis, and is given by:

$2QL=DA-d_L$ or $2QL=DA-DIR$.

Here, the points $P_1$ and $P_2$ lie in a common radial plane E which extends through the centers of the rolling bodies of one of the rows. The radial plane E extends through the row, above which the smallest radial spacing DA is formed.

Furthermore, there can be provision for a ratio of the bearing external diameter (DA) to the diameter (VTK) of the toothing reference circle of the spur toothing system which is on the wheel bearing arrangement side to be realized to be smaller than 1.8, that is to say $(DA/VTK)<1.8$.

Furthermore, there can preferably be provision for the ratio of the inner ring seat diameter (DIR) to the (axial) bearing width (LB) to be realized to be greater than 1.15, that is to say $(DIR/LB)>1.15$.

The axial bearing width, here in relation to the outer part, is formed by the greatest spacing which is oriented in the same direction as the rotational axis and is parallel to the rotational axis between those two points of the outer contour of the outer part which are spaced apart the furthest from one another in the same direction, points preferably being formed on those end sides of the outer ring which face away from one another and are usually of annular configuration.

The axial bearing width of the outer part can be greater or smaller than that of the inner part.

In one further preferred refinement, a ratio of the inner ring seat diameter (DIR) to the diameter of the rolling bodies (DW) of one of the at least two rows of rolling bodies is realized to be greater than four, that is to say $(DIR/DW)>4$.

Here, the diameter of the rolling bodies (DW) of that one of the at least two rows of rolling bodies can also preferably be used, which rolling body row lies axially closest to the spur toothing system on the wheel bearing arrangement side. The diameter of the rolling bodies (DW) of that one of the at least two rows of rolling bodies having the smallest loadbearing rolling bodies of the wheel bearing unit can also be used.

There can also be provision for the ratio of the inner ring seat diameter (DIR) to the rolling body row spacing (RA) of the at least two rows of rolling bodies to be realized to be greater than 2.7, that is to say $(DIR/RA)>2.7$.

Furthermore, there can be provision for the spur toothing system to be formed on the drive side, for example, on a joint (a joint bell) or on a shaft stub. On the wheel bearing arrangement side, the spur toothing system can be provided on the wheel hub or on an inner ring which is seated on the wheel hub.

As an alternative to this, the spur toothing system can be formed on a collar of the wheel hub, which collar is also called a rolling rivet flange. Said collar is deformed radially to the outside from a hollow section, which is preferably of rotationally symmetrical configuration, of the preassembly state of the wheel hub by plastic deformation. The wheel bearing arrangement is held within itself by way of the collar and is also, as a rule, clamped axially on account of an angular contact bearing arrangement.

In its initial state before the collar is folded over, the section is preferably of hollow-cylindrical or externally cylindrical design and at the same time internally conical on the inside or of any other desired design.

Further refinements of the invention provide combinations of the above-mentioned features in any desired number and arrangement.

All dimensions, ratios and calculation values which are considered with the invention and/or its developments represent nominal values without consideration of the production-related dimensional tolerances and other dimensional tolerances.

The wheel bearing arrangement according to the invention provides a narrow wheel bearing arrangement which, however, is of large diameter and therefore of rigid configuration as a result of a large toothing reference circle. As a result, more teeth can also be arranged circumferentially in the toothing system. The toothing system can be loaded by higher drive moments.

FIG. 1 shows one exemplary embodiment of the invention which will be explained in greater detail in the following text.

In the drawing:

FIG. 1 shows a wheel bearing arrangement according to one exemplary embodiment of the invention.

Figure 1:
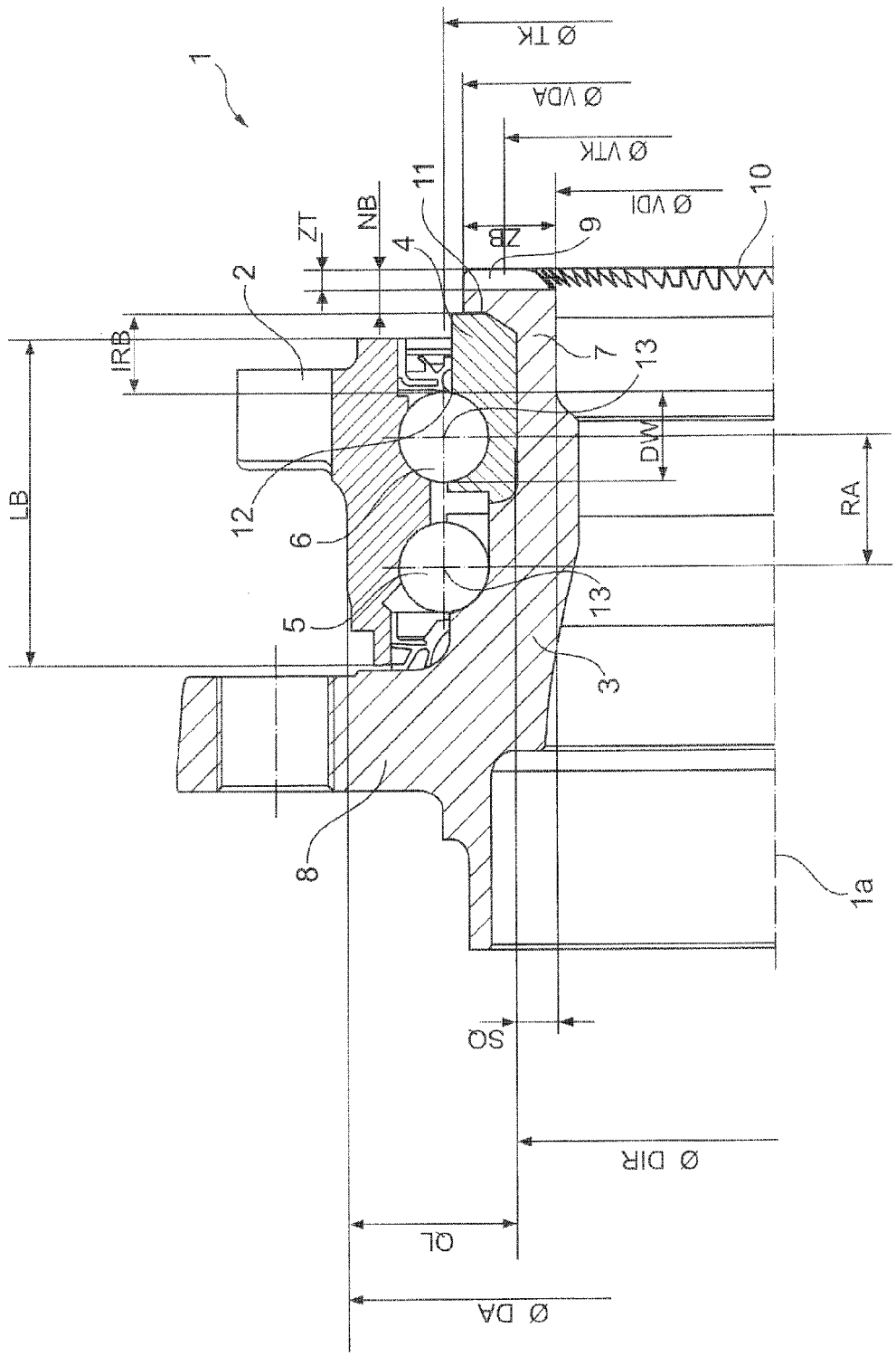
FIG. 1 shows one exemplary embodiment of the invention.

The wheel bearing arrangement 1 is formed from a flange 2 on the vehicle side, a wheel hub 3 having a wheel flange 8, from an inner ring 4 and from two rows 5, 6 of rolling bodies. The balls 14, in this case of both of the rows 5 and 6, are arranged with the reference circle of diameter TK about the rotational axis 1a of the wheel bearing unit 1. The reference circle extends through the centers 13 of the balls.

The inner ring 4 is seated on a hollow section 7 having the wall thickness SQ. The section 7 has the internal diameter VDI. A collar 9 is configured in one piece with the section 7 of the wheel hub 3. The collar 9 protrudes radially from the section 7 and, on the outside, has the external diameter VDA.

The wheel bearing arrangement 1, in this case an angular contact ball bearing arrangement, is prestressed by way of the collar 9. To this end, the collar 9 bears axially against an end side 11 of the inner ring 4, which end side 11 faces in the direction of the spur toothing system 10. The width IRB of the shoulder of the inner ring 4 is described by the axial spacing between the end side 11 and the transition 12 to the inner ring raceway.

A spur toothing system 10 which is delimited on the outside by the external diameter VDA of the toothing system 10 is formed on the collar. The spur toothing system is provided for engagement into an accordingly corresponding spur toothing system of the drive element (not shown).

In this exemplary embodiment, the external diameter of the spur toothing system 10 is therefore as large as the external diameter of the collar 9. Embodiments are also conceivable, in which the external diameter of the collar is greater than the external diameter of the spur toothing system.

The geometry of the spur toothing system is defined by the external diameter VDA, by the tooth width ZB and by the diameter VTK of the reference circle of the spur toothing system 10. The axially oriented tooth depth ZT is also defined by the axial width NB of the collar 9.

The geometry of the bearing is defined by the bearing external diameter DA, by the inner ring seat diameter DIR, by the diameter of the rolling bodies DW, by the bearing width LB, by the bearing cross section QL, and by the row spacing RA.

LIST OF DESIGNATIONS

| | |
|---|---|
| 1 | Wheel bearing arrangement |
| 1a | Rotational axis |
| 2 | Flange |
| 3 | Wheel hub |
| 4 | Inner ring |
| 5 | Row |
| 6 | Row |
| 7 | Section |
| 8 | Wheel flange |
| 9 | Collar |
| 10 | Spur toothing system |
| 11 | End side |
| 12 | Transition |
| 13 | Center |
| 14 | Balls |
| ZT | Tooth depth |
| ZB | Tooth width |
| TK | Reference circle |
| DA | Bearing external diameter |
| VTK | Toothing reference circle |
| DW | Rolling body diameter |
| DIR | Inner ring seat diameter |
| QL | Bearing cross-section |
| RA | Rolling body row spacing |
| LB | Bearing width, axial spacing |
| VDA | External diameter |
| VDI | Internal diameter |
| SQ | Wall thickness |
| IRB | Shoulder width |
| NB | Axial collar width |

The invention claimed is:

1. A wheel bearing arrangement, comprising:
at least two rows of rolling bodies for mounting a wheel hub which can be driven with the wheel bearing arrangement by a drive element, the wheel hub being connected to the drive element, and the wheel hub and the drive element engaging in a form-fitting manner into one another by means of a pair of mutually corresponding spur toothing systems,
wherein a ratio of a diameter of a toothing reference circle of the spur toothing system which is on the wheel bearing arrangement side to the rolling body row spacing of the at least two rows of rolling bodies is realized to be greater than three.

2. The wheel bearing arrangement of claim 1, wherein a ratio of the diameter of the toothing reference circle of the spur toothing system, which is on the wheel bearing arrangement side, to the diameter of the rolling bodies of one of the at least two rows of rolling bodies is realized to be greater than four.

3. The wheel bearing arrangement of claim 1, further comprising:
an inner ring, which is seated on the wheel hub for one of the rows, the inner ring being axially at least held on the wheel hub by means of a collar which is formed radially to an outside from a hollow section of the wheel hub,
wherein a ratio of the inner ring seat diameter to the bearing cross-section is realized to be greater than 2.2.

4. The wheel bearing arrangement of claim 1, wherein a ratio of the bearing external diameter to the diameter of the toothing reference circle of the spur toothing system, which is on the wheel bearing arrangement side, is realized to be smaller than 1.8.

5. The wheel bearing arrangement of claim 1, further comprising:
an inner ring, which is seated on the wheel hub for one of the rows, the inner ring being axially at least held on the wheel hub by means of a collar which is formed radially to an outside from a hollow section of the wheel hub,
wherein a ratio of the inner ring seat diameter to the bearing width is realized to be greater than 1.15.

6. The wheel bearing arrangement of claim 1, further comprising:
an inner ring, which is seated on the wheel hub for one of the rows, the inner ring being axially at least held on the wheel hub by means of a collar which is formed radially to an outside from a hollow section of the wheel hub,
wherein a ratio of the inner ring seat diameter to the diameter of the rolling bodies of one of the at least two rows of rolling bodies is realized to be greater than four.

7. The wheel bearing arrangement of claim 1, further comprising:
an inner ring, which is seated on the wheel hub for one of the rows, the inner ring being axially at least held on the wheel hub by means of a collar which is formed radially to an outside from a hollow section of the wheel hub, wherein a ratio of the inner ring seat diameter to the rolling body row spacing of the at least two rows of rolling bodies is realized to be greater than 2.7.

* * * * *